(12) United States Patent
Wellig et al.

(10) Patent No.: US 11,762,350 B2
(45) Date of Patent: Sep. 19, 2023

(54) METHODS AND SYSTEMS FOR DETECTING OCCUPANCY OF A SPACE

(71) Applicant: Honeywell International Inc., Charlotte, NC (US)

(72) Inventors: Armin Wellig, Mont-sur-Rolle (CH); Bhavesh Gupta, Niantic, CT (US); Grant T. Patterson, New Haven, CT (US); Ravi M. Sagar, East Lyme, CT (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 155 days.

(21) Appl. No.: 17/208,359

(22) Filed: Mar. 22, 2021

(65) Prior Publication Data

US 2022/0299954 A1    Sep. 22, 2022

(51) Int. Cl.
  *G05B 15/02*    (2006.01)
  *G01S 17/04*    (2020.01)
  *G01P 13/00*    (2006.01)

(52) U.S. Cl.
  CPC .............. *G05B 15/02* (2013.01); *G01P 13/00* (2013.01); *G01S 17/04* (2020.01)

(58) Field of Classification Search
  CPC ......... G05B 15/02; G01P 13/00; G01S 17/04; Y02B 20/40
  See application file for complete search history.

(56) References Cited

U.S. PATENT DOCUMENTS

| 6,250,601 B1 | 6/2001 | Kolar et al. |
| 7,552,030 B2 | 6/2009 | Guralnik et al. |
| 7,978,083 B2 | 7/2011 | Melker et al. |
| 8,395,515 B2 | 3/2013 | Tokhtuev et al. |
| 9,098,993 B2 | 8/2015 | Reed, Jr. |
| 9,685,065 B2 | 6/2017 | Diels |
| 10,705,108 B1 | 7/2020 | Moens et al. |

(Continued)

FOREIGN PATENT DOCUMENTS

| CN | 110456343 A | 11/2019 |
| KR | 101095017 B1 | 12/2011 |
| WO | 2018206934 A1 | 11/2018 |

OTHER PUBLICATIONS

Zhang et al., "Real-Time Human Motion Behavior Detection via CNN Using mmWave Radar," IEEE Sensors Council, 4 pages, Feb. 2019.

(Continued)

*Primary Examiner* — Charles R Kasenge
(74) *Attorney, Agent, or Firm* — Seager, Tufte & Wickhem, LLP

(57) ABSTRACT

A system for controlling one or more components servicing a space of a building based on an occupancy status of the space. The system may comprise a motion sensor, a person sensor for detecting each person passing through an access to the space, and a controller operatively coupled to the motion sensor and the person sensor. The controller may be configured to monitor the motion sensor for detected motion in the space, monitor the person sensor and maintain a people count of people currently in the space. The controller may use the detection of motion and/or the people count to determine if the space is occupied or unoccupied. The controller may then control one or more of the components servicing the space in a first control mode when the space is determined to be occupied and in a second control mode when the space is determined to be unoccupied.

20 Claims, 6 Drawing Sheets

(56) References Cited

U.S. PATENT DOCUMENTS

| | | |
|---|---|---|
| 2004/0030531 A1 | 2/2004 | Miller et al. |
| 2009/0171506 A1* | 7/2009 | Donaldson ......... G05D 23/1902 |
| | | 700/277 |
| 2009/0237651 A1 | 9/2009 | Arndt et al. |
| 2010/0103019 A1 | 4/2010 | Ammar |
| 2011/0295583 A1 | 12/2011 | Hollock et al. |
| 2012/0112906 A1 | 5/2012 | Borke et al. |
| 2014/0266693 A1 | 9/2014 | Moulton |
| 2015/0022316 A1 | 1/2015 | Dixon et al. |
| 2015/0156567 A1 | 6/2015 | Oliver et al. |
| 2016/0027278 A1 | 1/2016 | McIntosh et al. |
| 2017/0323376 A1 | 11/2017 | Glaser et al. |
| 2018/0005382 A1 | 1/2018 | Wang et al. |
| 2018/0053397 A1 | 2/2018 | Kaur et al. |
| 2018/0106897 A1 | 4/2018 | Shouldice et al. |
| 2018/0120412 A1 | 5/2018 | Kim |
| 2018/0299846 A1* | 10/2018 | Ray ...................... G06Q 10/063 |
| 2019/0035250 A1 | 1/2019 | Hunter et al. |
| 2019/0227156 A1 | 7/2019 | Santra et al. |
| 2019/0323897 A1 | 10/2019 | Wang et al. |
| 2020/0082551 A1* | 3/2020 | Steiner ................... G06T 7/215 |
| 2020/0226363 A1* | 7/2020 | Holliday ................ G06T 7/248 |
| 2021/0027882 A1 | 1/2021 | Wellig |

OTHER PUBLICATIONS

"A Sensor Above the Rest," Vayyar, 6 pages, accessed Oct. 7, 2020.
"White Paper: Usage of D6T-44L/D6T-8L Thermal Sensor," Omron Corporation, 18 pages, 2013.
"MEMS: Thermal Sensors-D6T," Omron C Electronic Components LLC, 7 pages, Nov. 2012.

* cited by examiner

METHODS AND SYSTEMS FOR DETECTING OCCUPANCY OF A SPACE

TECHNICAL FIELD

The disclosure generally relates to detecting occupancy of a space, and more particularly to systems and methods for monitoring occupancy of the space to aid in controlling one or more components that are servicing the space.

BACKGROUND

A space in a building can be monitored for occupancy, and one or more components of the building can be controlled based on the occupancy status of the space. For example, a climate control system may be controlled to provide comfort when a space is occupied and controlled to save energy when the space is unoccupied. What would be desirable is a method and system to help improve the accuracy of occupancy detection in a space while respecting the privacy of people in the space.

SUMMARY

The disclosure generally relates to detecting occupancy of a space, and more particularly to systems and methods for monitoring occupancy of the space to aid in controlling one or more components that are servicing the space.

In one example, a system includes a motion sensor for detecting motion in at least part of a space, a person sensor for detecting each person passing through an access to the space as well as whether the person passed into or out of the space. A controller may be configured to monitor the motion sensor for detected motion in the space. The controller may also monitor the person sensor and maintain a people count of people currently in the space by increasing the people count when the person sensor detects a person passing into the space and decreasing the people count when the person sensor detects a person passing out of the space. The controller may determine that the space is occupied when the motion sensor detects motion in the space, determine that the space is occupied when the motion sensor does not detect motion in the space but the people count maintained by the controller is greater than zero, and determine that the space is unoccupied when the motion sensor does not detect motion in the space and the people count maintained by the controller is zero. The controller may control one or more components servicing the space in a first control mode when the space is determined to be occupied and in a second control mode when the space is determined to be unoccupied.

In another example, a system for controlling one or more components servicing a space of a building based on an occupancy status of the space may include a passive infrared (PIR) motion sensor for detecting motion in at least part of the space, a person sensor for detecting each person passing through a doorway of the space as well as whether the person passed into the space or out of the space, and a controller operatively coupled to the PIR motion sensor and the person sensor. The controller may be configured to monitor the PIR motion sensor for detected motion in the space. The controller may also monitor the person sensor and maintain a people count of people currently in the space by increasing the people count when the person sensor detects a person passing into the space and decreasing the people count when the person sensor detects a person passing out of the space. The controller may determine that the space is occupied when the PIR motion sensor detects motion in the space, determine that the space is occupied when the PIR motion sensor does not detect motion in the space but the people count maintained by the controller is greater than zero, and determine that the space is unoccupied when the PIR motion sensor does not detect motion in the space and the people count maintained by the controller is zero. The controller may control one or more of the components servicing the space in a first control mode when the space is determined to be occupied and in a second control mode when the space is determined to be unoccupied.

In another example, a method for controlling one or more components servicing a space of a building based on an occupancy status of the space may include receiving an output from a motion sensor that monitors for motion in at least part of the space. The method may further include receiving an output from a person sensor, wherein the person sensor detects each person passing through a doorway of the space as well as whether the person passed into the space or out of the space. A people count of people currently in the space may be maintained by increasing the people count when the person sensor detects a person passing into the space and decreasing the people count when the person sensor detects a person passing out of the space. The method may determine that the space is occupied when the motion sensor detects motion in the space, determine that the space is occupied when the motion sensor does not detect motion in the space but the people count is greater than zero, and determine that the space is unoccupied when the motion sensor does not detect motion in the space and the people count is zero. One or more of the components servicing the space may be controlled in a first control mode when the space is determined to be occupied and in a second control mode when the space is determined to be unoccupied.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which.

Figure 1:
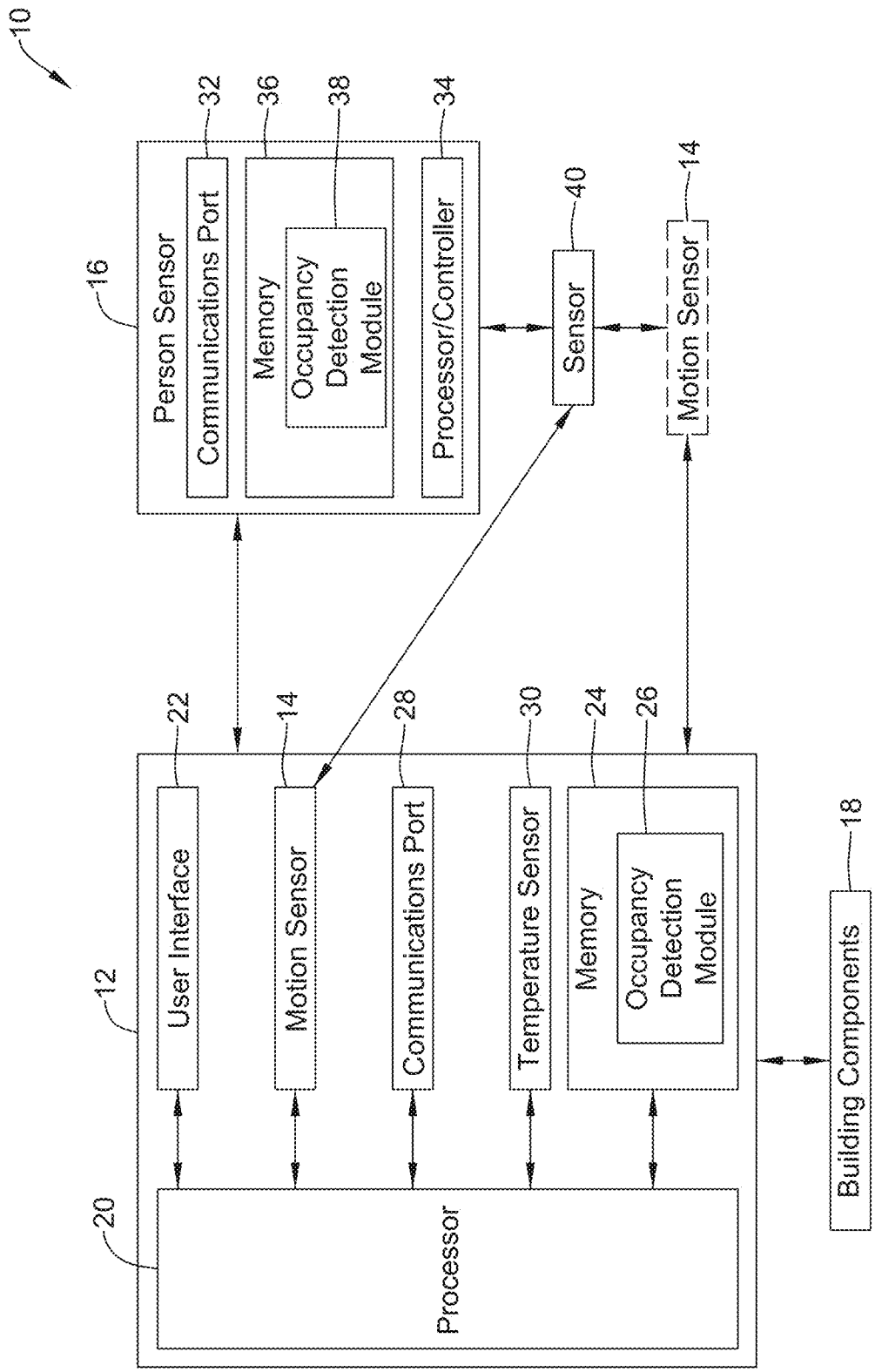
FIG. 1 is a block diagram of an illustrative system for monitoring occupancy of a space schematic view of an illustrative unoccupied space.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

A space in a building can be monitored to detect the presence of people in the space. This occupancy information may be used to, for example, control one or more systems of a building management system. For example, a climate control system may be controlled to provide comfort when a space is occupied, and to save energy when the space is unoccupied. In one particular example, hotel guestrooms are frequently unoccupied. Thus, it would be desirable to control the heating, ventilation, and air conditioning (HVAC) system in a manner that conserves energy when the guestroom is unoccupied but maintains guest comfort when the guestroom is occupied.

In some cases, a passive infrared (PIR) sensor is used to determine occupancy of a space. However, PIR sensors may not accurately report the occupancy status of a space. For example, if someone is asleep in bed of a hotel guestroom, the PIR sensor may not detect motion and the guestroom may be determined to be unoccupied when in fact it is occupied. Moreover, in many cases, a PIR sensor may not detect motion in some areas of a guestroom. For example, a PIR sensor may not "see" into the bathroom of the guestroom. As such, when a guest enters the bathroom, the PIR sensor may not detect motion in the guestroom. Continuing with this example, when a guestroom is determined to be unoccupied when in fact it is occupied, the building management system may cause the conditions (e.g. temperature, lighting and/or other conditions) in the guestroom to deviate from what is considered occupant comfort conditions, causing occupant dissatisfaction. When the guestroom is determined to be occupied when in fact it is unoccupied, the building management system may cause the conditions (e.g. temperature, lighting and/or other conditions) in the guestroom to remain in a comfort mode thereby causing excess energy usage. Neither of these are desirable. While hotel guestrooms are used as an example here, it is contemplated that the present disclosure applies to any suitable space in a building including offices in an office building, conference rooms, and/or any other suitable space in a building. The present disclosure can also be applied to spaces outside of a building that have an access to the space.

This disclosure generally relates to methods and systems for determining an occupancy of a space and controlling one or more components servicing a space of a building based on an occupancy status of the space. While the system is described with respect to a hotel guestroom, it is contemplated that the system may be used in other environments to monitor occupancy, such as, but not limited to, medical facilities, senior care facilities, nursing homes, apartments, homes, office buildings, etc. It is also contemplated that the present disclosure can also be applied to spaces outside of a building that have a defined access to the space.

FIG. 1 is a schematic block diagram of an illustrative system for controlling one or more components servicing a space of a building based on an occupancy status of the space. The illustrative system 10 may allow for people counting or occupancy detection without the use of cameras. The system 10 may be configured to identify a number of people in the space to determine a mode of operation of one or more components (e.g., HVAC components, lighting, etc.) servicing the space based on an occupancy status of the space.

Generally, the illustrative system includes a controller 12, a motion sensor 14, and a person sensor 16. In some cases, controller 12 may be a wall module such as HVAC wall module which may include, but is not limited to, a thermostat, but this is not required. It is contemplated that the controller 12 may be any type of controller 12, including a controller for an HVAC system, a lighting system, a security system, a fire suppression system, an energy management system, and/or any other suitable building control system. The controller 12 may be located in the space or at a remote location. The remote location may be in the building, or remote from the building such implemented in a server located as in the cloud. In some cases, part of the controller 12 may be a distributed controller, with parts in the space, in the building and/or in the cloud. These are just examples.

In some cases, the controller 12 may receive information from the motion sensor 14 and the person sensor 16. In some cases, part or all of the controller 12 may be implemented by the motion sensor 14 and/or the person sensor 16. In the example shown, the controller 12 is communicatively coupled with one or more building system components 18 (e.g., HVAC equipment, lighting, etc.).

The illustrative controller 12 includes a processor 20 and a user interface 22. In some cases, the processor 20 may include a programmable microprocessor. Such a programmable microprocessor may allow a user to modify the control logic of the controller 12 even after it is installed in the field (e.g., firmware update, application update). It is contemplated that controller 12 may generate control signals that are directly provided to building control equipment 18 or may merely pass parameters to a separate control module (not shown) that then generates and provides control signals to the building control equipment 18.

In some cases, controller 12 may be an HVAC controller (in some cases, a thermostat) that generates control signals for controlling HVAC equipment. For example, controller 12 may be configured to operate in accordance with an algorithm that controls or at least partially controls one or more components of an HVAC system that services the space. In some instances, the algorithm may include a number of operating parameters. Examples of HVAC components that may be controlled by controller 12 include one or more of a fan coil HVAC system, a mini-split HVAC system, a furnace, a boiler for hot water heat or steam heat, a heat pump, an air conditioning unit, a humidifier, a dehumidifier, an air exchanger, an air cleaner, a fan and/or any other suitable HVAC component. Controller 12 may, for example, operate in accordance with an algorithm that provides temperature set points, starting and/or ending times, and the like. As will be described in more detail herein, the algorithm may take into consideration an occupancy status of the space when determining how to operate the HVAC components that service the space.

The user interface 22 may be any suitable interface that permits controller 12 to display and/or solicit information as well as permits a user to enter data such as temperature set points, humidity set points, starting times, ending times, and the like. In some cases, the user interface 22 may include a display and a distinct keypad. A display may be any suitable alphanumeric display. In some instances, a display may include or may be a liquid crystal display (LCD). If desired, the user interface 22 may be a touch screen LCD panel that functions as both display and keypad. In some instances, a touch screen LCD panel may be adapted to solicit values for a number of operating parameters and/or to receive said values. In some cases, the display of the user interface 22 may include a backlight, and the intensity of the backlight may be controlled by the controller 12. In some cases, the display of the user interface 22 may be turned off and on by the controller 12. In some cases, the user interface 22 may be located in the space, sometimes part of a wall module. In some cases, the user interface 22 may be implemented by a mobile device such as a mobile phone, a tablet computer and/or any other mobile device. The mobile device may be in communication with the communications port 28 or the like, sometimes via a network connection.

As described herein, the controller 12 may include one or more controllers or processors 20 that execute instructions stored in the system memory 24. The system memory 24 of the controller 12 can include computer system readable media in the form of volatile memory, such as random-access memory (RAM) and/or cache memory. The controller 12 may further include other removable/non-removable, volatile/non-volatile computer system storage media. By way of example only, the storage system can be provided for reading from and writing to a non-removable, non-volatile magnetic media (not shown and typically called a "hard drive" or flash memory). The processor 20 and/or memory 24 may include at least one program/utility having a set of program modules that are configured to receive an input from or transmit an output to a motion sensor 14, a person sensor 16, and/or building components 18. The memory 24 may be used to store any desired information, such as the aforementioned control algorithm, set points, and the like. In some cases, the memory 24 may store one or more application program modules (e.g., software), such as an occupancy detection module 26. The processor 12 may store information within the memory block 24 and may subsequently retrieved the stored information.

In some cases, as illustrated, the controller 12 may include a communications port 28 for operatively coupling to, for example, the motion sensor 14, the person sensor 16, door sensor 40 and/or the building components 18. It is contemplated that the communications port 28 may be wired and/or wireless. When the communications port 28 is wireless, the communications port 28 may include a wireless transceiver, and the motion sensor 14, the person sensor 16, door sensor 40, and/or the building components 18 may include a compatible wireless transceiver. It is contemplated that the wireless transceivers may communicate using a standard and/or a proprietary communication protocol. Suitable standard wireless protocols may include, for example, cellular communication, ZigBee, Bluetooth, WiFi, IrDA, dedicated short range communication (DSRC), EnOcean, or any other suitable wireless protocols, as desired.

In some cases, the controller 12 may include a power-transformation block (not explicitly shown) which may be configured to bleed or steal energy from the one or more wires of an I/O block (if so provided). The power bled off of the one or more wires of the I/O block may be stored in an energy storage device (not explicitly shown) that may be used to at least partially power the controller 12. In some cases, the energy storage device may be capacitor or a rechargeable battery. In addition, the controller 12 may also include a back-up source of energy such as, for example, a battery that may be used to supplement power supplied to the controller 12 when the amount of available power stored by the energy storage device is less than optimal or is insufficient to power certain applications.

In some cases, the motion sensor 14 may be provided as a separate device from the controller 12. In other cases, the motion sensor 14 may be included within or housed by the controller 12. It is contemplated that when the motion sensor 14 is provided within the housing of the controller 12, the controller 12 may also supply power to the motion sensor 14. If the motion sensor 14 is provided as a separate device from the controller 12, the motion sensor 14 may include a battery or may be hard wired into a power source. The motion sensor 14 may be configured to communicate with the controller 12 and/or processor 20 (regardless of whether the motion sensor 14 is housed within the controller 12 or provided as a separate device) and may be used for sensing occupancy of a room or space. In some instances, the motion sensor 14 may be a multi-pixel passive infrared (PIR) sensor. In other examples, the motion sensor may be a millimeter wave (mmWave) sensor. Other types of motion sensors may include, but are not limited to, microwave sensors, vibration motion sensors, ultrasonic motion sensors, reflective motion sensors, combinations thereof, etc. However, in order to protect the privacy of the occupants of the space being monitored, the motion sensor preferably does not use an image-based motion sensor such as a video or still camera.

It is contemplated that the multi-pixel passive infrared (PIR) sensor may include four or more individually readable pixels arranged in two or more rows and two or more columns and may be used to acquire a low-resolution thermal image that is not suitable for identifying a particular person's identity. In some cases, the multi-pixel passive infrared (PIR) sensor may include a two-dimensional array of passive infrared pixels. Example two dimensional arrays of passive infrared pixels include a 2×2 array, a 2×3 array, a 2×4 array, a 3×3 array, a 4×4 array, a 6×6 array, an 8×8 array, a 16×16 array, a 32×32 array, a 64×64 array, a 128×128 array, and/or any other suitable two-dimensional array as desired.

All objects with a temperature above absolute zero emit heat energy in the form of radiation. The heat radiation is invisible for human eyes because it radiates at infrared wavelengths, but it can be detected by electronic devices designed for such a purpose (e.g., passive/pyroelectric infrared detector—PIR). An individual PIR sensor can detect changes in the amount of incident infrared radiation. When an object, such as a human, passes in front of the background, such as a wall, the temperature at that point in the sensor's field of view will change from room temperature to a body temperature, and then back again. The sensor converts the resulting change from the incoming infrared radiation into a change in the output voltage, and this can be used to trigger the detection of a human.

In some cases, each pixel of the multi-pixel passive PIR sensor may be measured as a value that is proportional to the amount of incident infrared radiation at that pixel, and not merely as a threshold change as in a standard PIR sensor. Output of these "pixels" may provide a stream of data with a pre-set sample rate (e.g., an 8×8 pixel solution may have 64 values per frame).

In some cases, other sensors 30 or more than one motion sensor 14 may be provided. For example, when the controller 12 is a thermostat, one or more temperature sensors 30 may be provided. Such temperature sensors may be used by the controller 12 to sense and then control the temperature in an inside space of a building.

In the example shown, the controller 12 is operatively coupled to the person sensor 16. The person sensor 16 may be configured to detect the number of people passing through an access point to a space and a direction of traveling (e.g., entering or exiting the space). The person sensor 16 may take a number of different forms, including, but not limited to, time of flight sensors (ToF), light detection and ranging (LiDAR) sensors, millimeter wave (mmWave) sensors, etc. In some cases, the person sensor 16 may work by measuring a length of time it takes for a transmitted signal to reflect off of an objection and return to the person sensor 16. In some cases, the person sensor 16 may be positioned adjacent to an access point (e.g., a doorway) of a space to count people as they enter and/or exit the space. In one example, the person sensor 16 may be mounted to a wall adjacent to a door frame. In another example, the person sensor 16 may be mounted to the ceiling, adjacent to the doorway. However, other mounting locations may be used as desired. In some cases, more than one person sensor 16 may be provided, depending on the size and/or shape of room and/or a number of access points to the room.

The person sensor 16 may include a communications port 32 for operatively coupling the person sensor 16 to the controller 12 and/or the sensor 40. It is contemplated that the communications port 32 may be wired and/or wireless. When the communications port 32 is wireless, the communications port 32 may include a wireless transceiver, and the controller 12 and/or the sensor 40 may include a compatible wireless transceiver. It is contemplated that the wireless transceivers may communicate using a standard and/or a proprietary communication protocol. Suitable standard wireless protocols may include, for example, cellular communication, ZigBee, Bluetooth, WiFi, IrDA, dedicated short range communication (DSRC), EnOcean, or any other suitable wireless protocols, as desired.

The illustrative person sensor 16 may include one or more controllers or processors 34 that execute instructions stored in the system memory 36. In some cases, the controller 34 of the person sensor 16 may include a programmable microprocessor. Such a programmable microprocessor may allow a user to modify the control logic of the person sensor 16 even after it is installed in the field (e.g., firmware update, application update). The system memory 36 of the person sensor 16 can include computer system readable media in the form of volatile memory, such as random-access memory (RAM) and/or cache memory. The person sensor 16 may further include other removable/non-removable, volatile/non-volatile computer system storage media. By way of example only, the storage system can be provided for reading from and writing to a non-removable, non-volatile magnetic media (not shown and typically called a "hard drive" or flash memory). The system controller 34 and/or memory 36 may include at least one program/utility having a set of program modules that are configured to receive an input from or transmit an output to the controller 12 and/or the sensor 40.

In one example, the program/utility may be stored in the system memory 36 and may include one or more application program modules (e.g., software), such as an occupancy detection module 38. When so provided, the occupancy detection module 38 may determine an occupancy status of the space using information received from the controller 12 and/or in concert with the controller 12. While not explicitly shown, the person sensor 16 may be battery powered or hard wired into a power source, as desired.

The illustrative system 10 further includes a sensor 40 communicatively coupled to the person sensor 16 and/or the controller 12. In some cases, the sensor 40 may be a magnetic switch, a limit switch, or other device configured to detect activity or when an access point (e.g. door) is opened and/or closed. In some cases, the person sensor 16 may initiate a people count or "wake up" in response to a signal from the sensor 40 indicating that the access point has been opened. Similarly, the motion sensor 14 may be configured to detect motion in response to a signal from the sensor 40 indicating that the access point has been opened. These are just examples. For example, other detected activity may be used to wake up the person sensor 16. In another example, the person sensor 16 may be activated by an auxiliary ultra-low power motion sensor which is always on. In some cases, the auxiliary ultra-low power motion sensor may be a part of the person sensor 16 hardware, although this is not required. In another example, the person sensor 16 may be activated when a sound threshold is exceeded. In some cases, a microphone or sound sensor may be a part of the person sensor 16 hardware, although this is not required.

Figure 2:
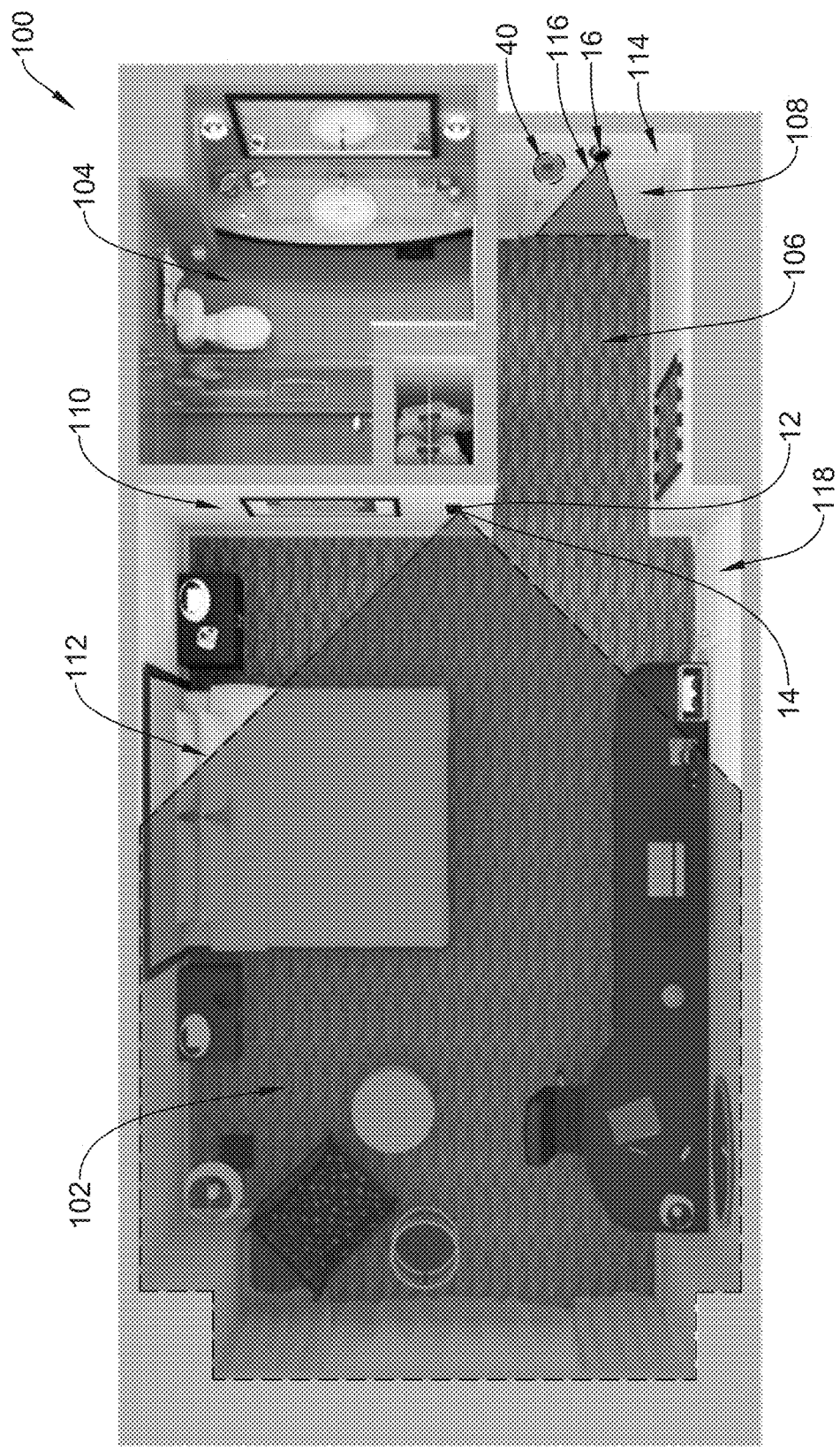
FIG. 2 is a schematic view of an illustrative unoccupied space.

FIG. 2 is a schematic overhead view of an illustrative space 100 of a building that may utilize the system 10 for controlling one or more components servicing the space 100 based on an occupancy status of the space 100. In FIG. 2, the illustrative space 100 may be a hotel guestroom. However, this is not required. The space 100 may include a sleeping and/or living area 102, a bathroom 104, and/or a short hallway 106. This is just one example. The space 100 may include different layouts and/or different areas, as desired. The space 100 may include a controller 12 and a motion sensor 14. As described above, in some cases, the controller 12 may be a thermostat configured to control the HVAC system for the space as well as provide an interface to allow a guest to adjust a setpoint to their comfort preferences. In some cases, the controller 12 and the motion sensor 14 may be housed in the same housing or provided as separate devices, as desired. The motion sensor 14 may be positioned on a wall 110 of the space 100 at a location that maximizes the field of view 112 of the motion sensor 14. In some cases, the motion sensor 14 may be mounted in locations other than on a wall, such as, but not limited to, a picture frame, a piece of furniture, a window frame, the ceiling, etc. The motion sensor 14 may be configured to anonymously detect motion in at least part of the space 100 (e.g., within the field of view 112 of the motion sensor 14).

The space 100 may further include a person sensor 16 positioned at or adjacent to an access point 108, such as, but not limited to, a doorway, of the space 100. It is contemplated that the direction in which the door 108 swings may determine, at least in part, a placement location of the person sensor 16. The person sensor 16 may be mounted interior to the space 100 or exterior of the space 100, as desired. The person sensor 16 may take a number of different forms which anonymously detect each person passing through the access 108 into or out of the space 100, including, but not limited to, time of flight sensors (ToF), light detection and ranging (LiDAR) sensors, millimeter wave (mmWave) sensors, etc. In some cases, the person sensor 16 may be mounted on a wall 114 adjacent the access point 108. The person sensor 16 may be oriented such that the field of view 116 of the person sensor 16 captures people as they enter and/or exit the access point 108 to the space 100. While the field of view 116 of the person sensor 16 is illustrated as generally planar, it should be understood that the field of view 116 may extend into the hallway 106 such that the person sensor 16 can determine a direction of travel of one or more persons in order to determine if the one or more persons are entering and/or exiting the space 100. In some cases, a sensor 40 configured to detect an opening and/or closing of the access point 108 (e.g. door) may be positioned adjacent to the access point 108. It is contemplated that other sensors may be used to detect the opening and/or closing of the access point 108, as desired. If the space 100 has a second access point 118, a second person sensor (not explicitly shown) and a second switch (not explicitly shown) may be provided near the second access point 118, as desired.

Figure 3:
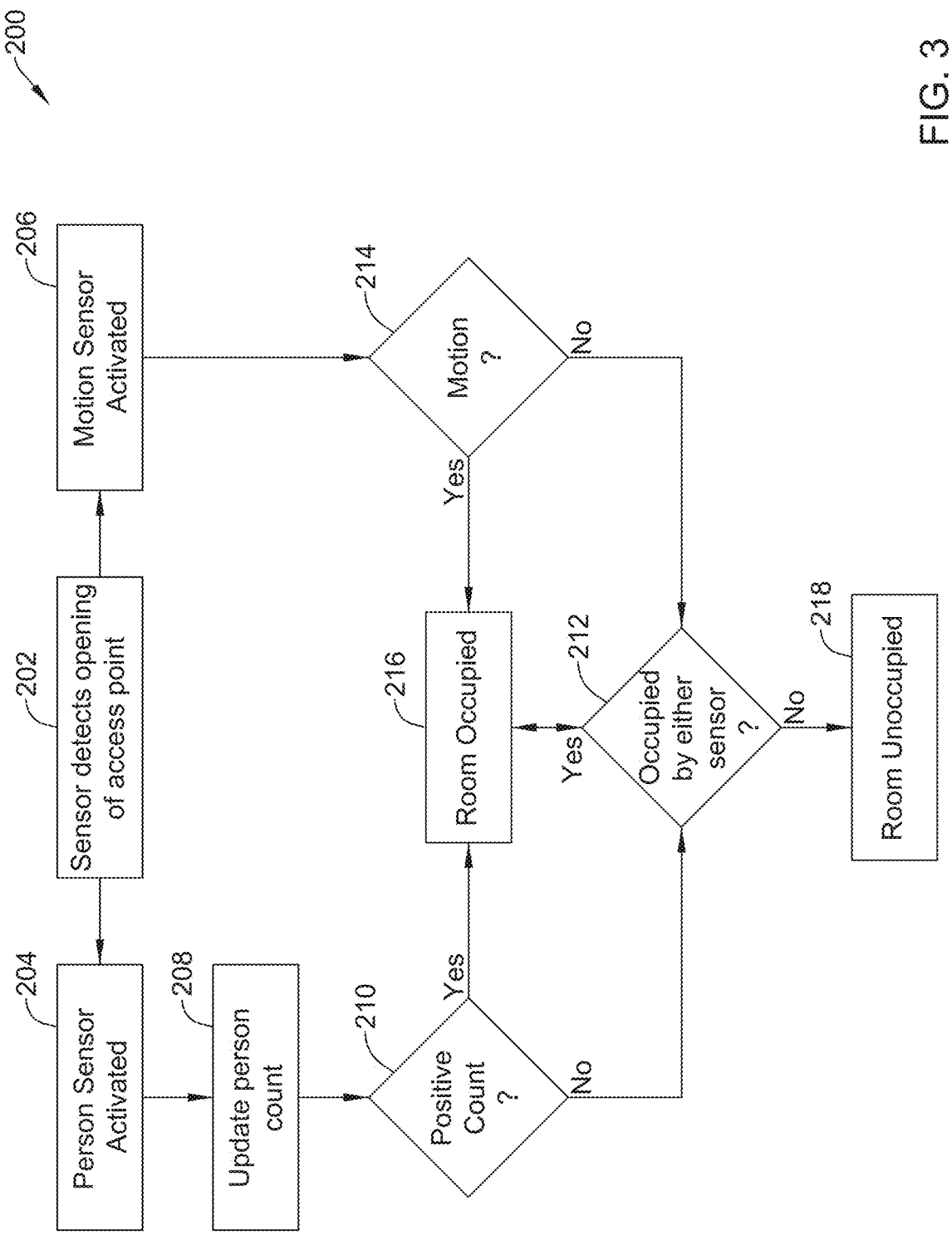
FIG. 3 is a schematic flow chart of an illustrative method for determining an occupancy status of a space.

In the example shown, the motion sensor 14 and the person sensor 16 work together to determine an occupancy status of the space 100. FIG. 3 is a schematic flow chart of an illustrative method 200 for determining an occupancy status of a space, such as, but not limited to space 100. While the method 200 is described with respect to a particular space 100, it should be understood that the method may be applied to any space as desired. It is contemplated that the occupancy status need not be continually monitored and/or verified. For example, the occupancy status of the space 100 may change only when the door 108 is opened. This may help conserve battery life and/or conserve energy as the occupancy status is only expected to change when the door 108 is opened. Thus, the method 200 may be initiated or activated upon the sensor 40 detecting opening of the access point 108, as shown at block 202. Detection of the opening of the access point 108 may trigger the activation of the person sensor 16, as shown at block 204 and/or the activation of the motion sensor 14, as shown at block 206.

The person sensor 16 may be used to determine if one or more persons has entered the space 100, one or more persons have exited the space 100, or if the access point 108 was opened with no one entering or exiting the space. In some cases, the processor 34 of the person sensor 16 may analyze raw data gathered by the person sensor 16 to determine if one or more persons have entered and/or exited the space 100. In other cases, the person sensor 16 may transmit the raw data to the controller 12 for analysis. In yet other instances, some of the processing may occur at the person sensor 16 and some at the controller 12. For example, the person sensor 16 may detect both a number of persons passing under the person sensor 16 and a direction of travel. If the person does not cross a threshold point (into or out of the space 100), the person sensor 16 may determine the person has not entered or exited the space 100. When the person sensor 16 determines that a person has entered or exited the space 100, a person count, stored in a memory 36 of the person sensor 16 or a memory 24 of the controller 12 may be updated, as shown at block 208. For example, when a person is deemed to have entered the space 100, the person count is increased, and when a person is deemed to have exited the space, the person count is decreased. It is contemplated that the person count may be zero or any positive integer. The person count may be analyzed to determine if the person count is zero or greater than zero (e.g., one or more), as shown at block 210. If the person count is a positive integer, the space 100 may be determined to be occupied, as shown at block 216. If the person count is zero, the status of the motion sensor 14 (which may also be activated by the opening of the access point 108) is checked to determine if the motion sensor 14 has detected occupancy, as shown at block 212. For example, if the person count is determined to be zero and the motion detector 14 has not detected motion, the space may be determined to be unoccupied, as shown at block 218.

As described above, the motion sensor 14 may be activated at block 206 upon detection of the opening of the access point at block 202, but this is not required. The motion sensor 14 may be used to determine if there is motion in the space 100, as shown at block 214. In some cases, the controller 12 may analyze data from the motion sensor 14. In other cases, the analysis may be performed at the motion sensor 14 and/or the controller 12, or combinations thereof. If motion is detected, the space 100 may be determined to be occupied, as shown at block 216. If motion is not detected, the status of the person sensor 16 (which may also be activated by the opening of the access point 108) is checked to determine if the person sensor 16 has detected occupancy (e.g., has a positive person count), as shown at block 212. When the motion detector 14 has not detected motion and if the person count is determined to be zero, the space 100 may be determined to be unoccupied, as shown at block 218.

Figure 4:
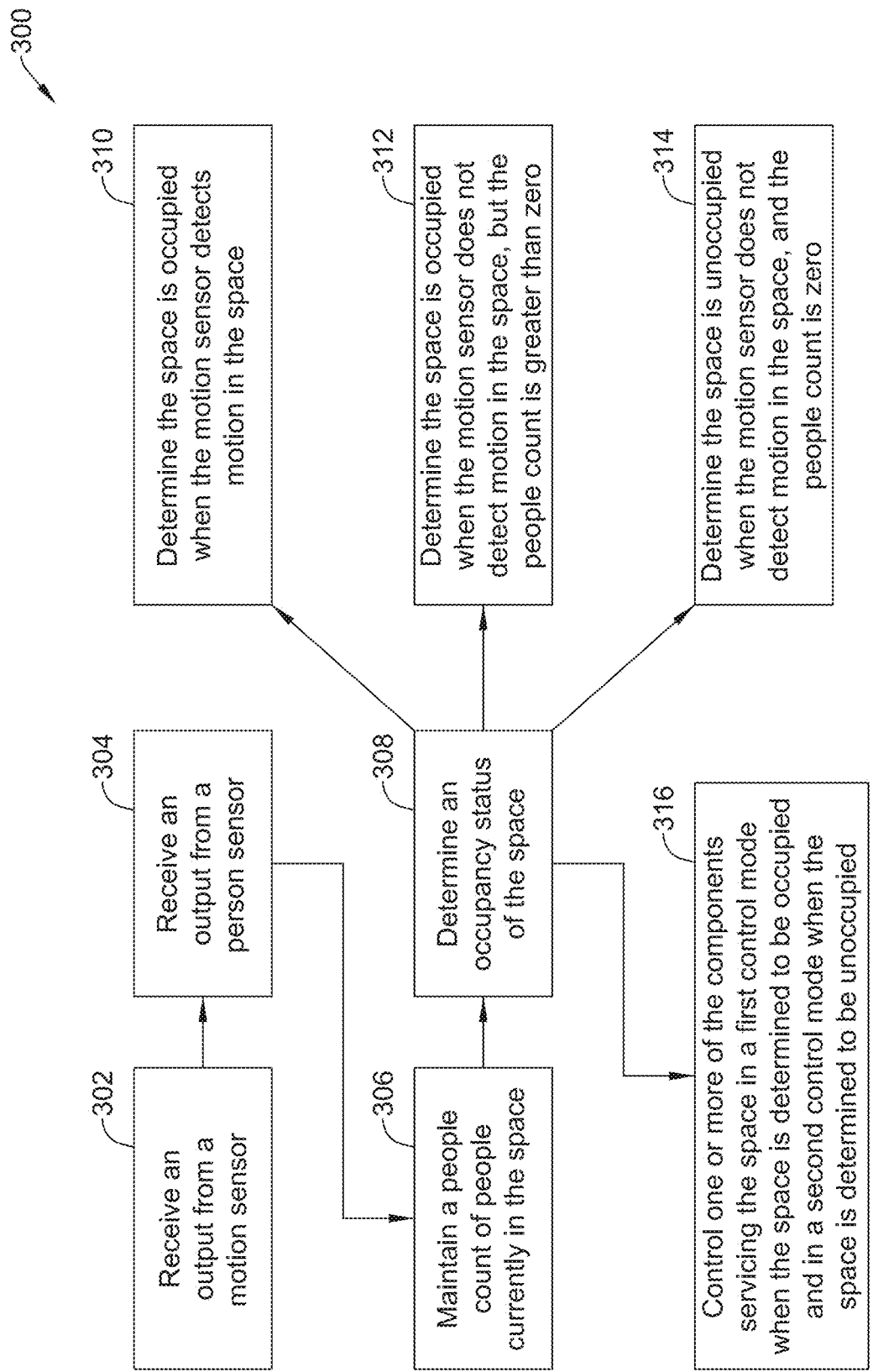
FIG. 4 is schematic flow chart of another illustrative method for determining an occupancy status of a space.

FIG. 4 is schematic flow chart 300 of a method for using the system 10 to determine an occupancy status of the space 100. While the method 300 is described with respect to a particular space 100, it should be understood that the method may be applied to any space, whether indoor or outdoor. Generally, the controller 12 may be configured to receive data from the motion sensor 14, the person sensor 16, and the access sensor 40, analyze the data, and make decisions based on the received data, as will be described in more detail herein.

The controller 12 may include control circuitry and logic configured to operate, control, command, etc. the various components (not explicitly shown) of the system 10 and/or provide control commands to one or more of the components 18 servicing the space 100. In some cases, all of the processing may occur at a single controller 12. In other cases, the controller may be a distributed controller that is distributed among a plurality of controllers.

To begin, the controller 12 may receive an output from a motion sensor 14, as shown at block 302. As described above, the motion sensor 14 may be positioned to monitor for motion in at least part of the space 100. In some cases, the controller 12 may be configured to monitor the motion sensor 14 for detected motion in the space 100. In some cases, the motion sensor 14 may be activated in response to a signal generated at the access sensor 40. For example, when the access sensor 40 determines that an access point (e.g. door) has been opened, the motion sensor 14 may begin transmitting motion information to the controller 12. In some cases, the output of the motion sensor 14 may indicate if motion is or is not detected. In other cases, the controller 12 may be configured to analyze raw data output from the motion sensor 14 to determine if motion is or is not detected.

In the example shown, the controller 12 may also receive an output from a person sensor 16, as shown at block 304. As described above, the person sensor 16 may be configured to detect each person passing through a doorway 108 of the space 100 as well as whether the person has passed into or out of the space. The controller 12 may be configured to receive the output from the person sensor 16 along with the output of the motion sensor 14. The person sensor 16 may transmit data to the controller 12, which is monitoring the person sensor 16 in order to maintain a people count of people currently in the space 100, as shown at block 306. For example, the controller 12 may be configured to increase the people count when the person sensor 16 detects a person passing through the access 108 and into the space 100, and decrease the people count when the person sensor 16 detects a person passing through the access 108 and out of the space 100. In some cases, the people count is not allowed to be less than zero. In some cases, the output of the person sensor 16 may provide a number of people and a direction of travel through the access 108. In other cases, the controller 12 may be configured to analyze raw data output from the person sensor 16 to determine the number of people and the direction of travel of each person through the access 108.

Figure 5:
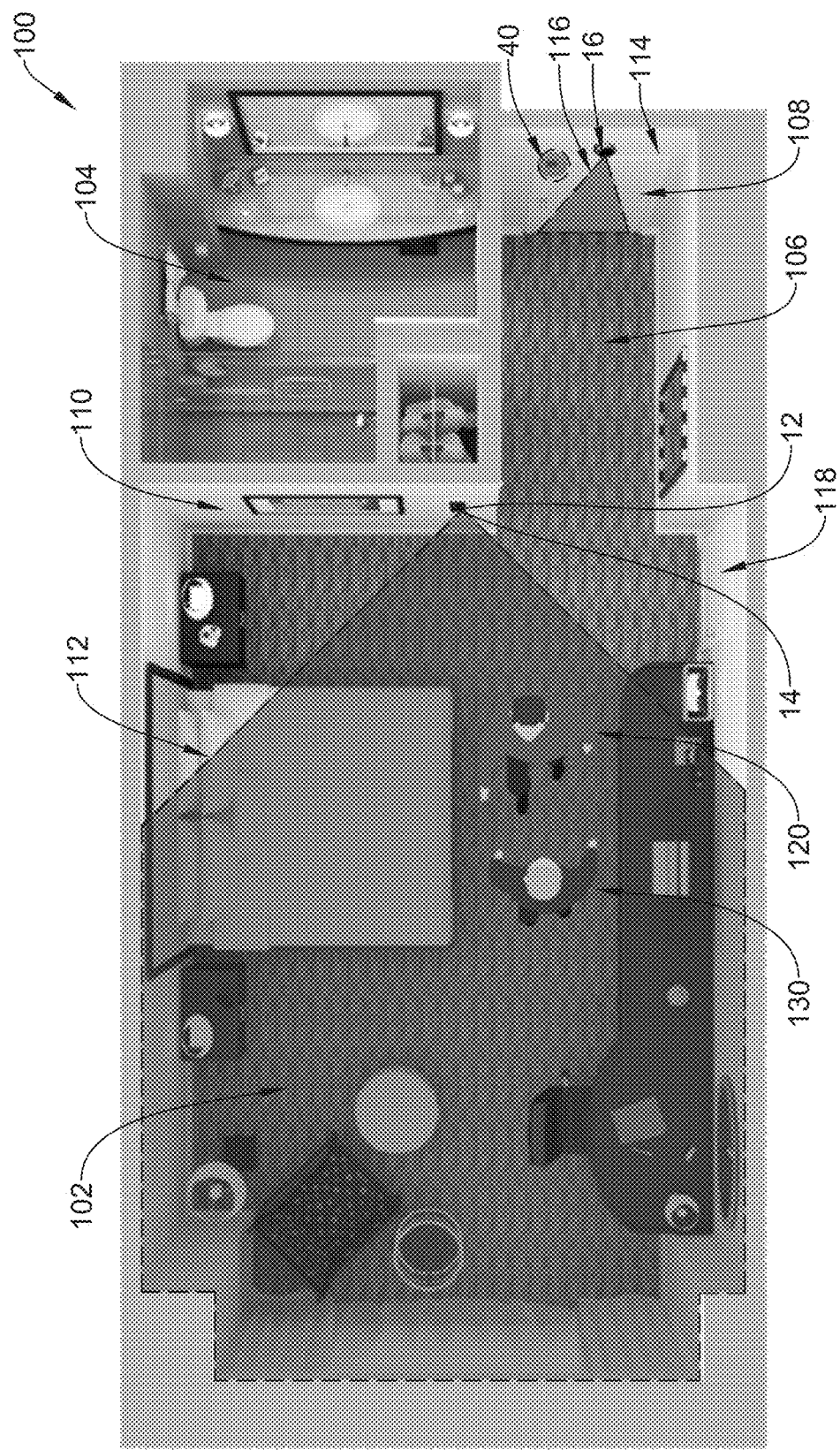
FIG. 5 is a schematic view of an illustrative occupied space.

The controller 12 may determine an occupancy status (e.g., occupied or unoccupied) of the space 100, as shown at block 308. In the example shown, the controller 12 may determine that the space 100 is occupied when the motion sensor 14 detects motion in the space 100, as shown at block 310. Referring briefly to FIG. 5, which illustrates two people 120, 130 in the space 100 and within the field of view of the motion sensor 14. In the illustrated scenario, the motion sensor 14 would detect the movement of the people 120, 130 and thus it would be determined that the space is occupied. In such an instance, the presence of motion in the space 100 is a strong indicator that the space 100 is occupied. The people count is updated and maintained at the controller 12. In the illustrative embodiment of FIG. 5, the people count would be two (e.g., greater than zero) as both people passed through the door 108 to enter the space 100. In some cases, when motion is detected, the controller 12 may verify the people count is greater than zero as motion in the space 100 is an indication the space 100 is occupied. If motion is detected and the people count is zero, the controller 12 may increase the people count, such as to a value of one.

Figure 6:
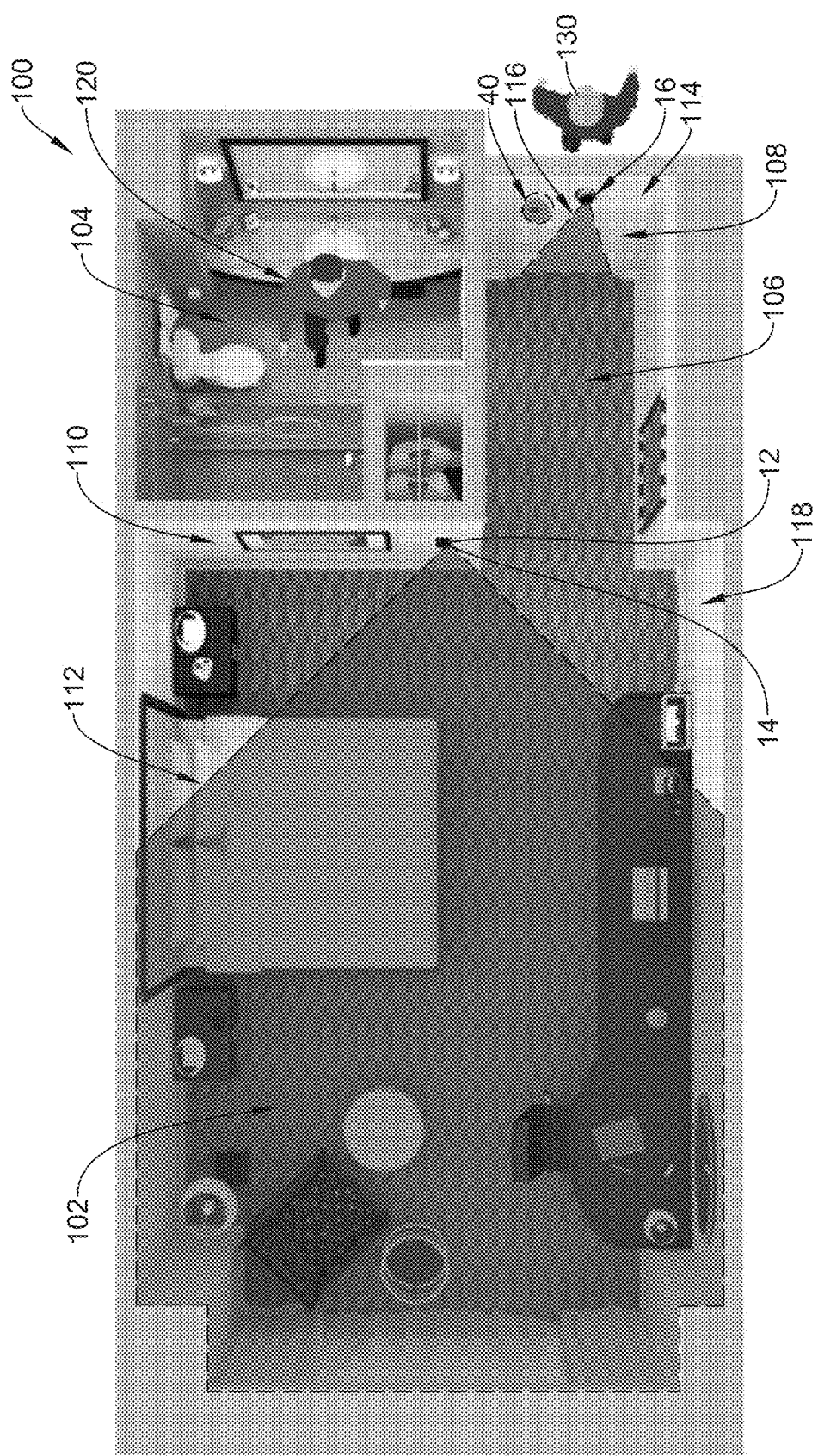
FIG. 6 is another schematic view of an illustrative occupied space.

Returning to FIG. 4, the controller 12 may also determine that the space 100 is occupied when the motion sensor 14 does not detect motion in the space 100 but the people count is greater than zero, as shown at block 312. Referring briefly to FIG. 6, which illustrates one person 120 is within the space 100 but outside of the field of view 112 of the motion sensor 14 (e.g., within the bathroom 104) while the second person 130 of FIG. 5 has exited the space. In this scenario, the motion sensor 14 would not detect motion as the person is not within the field of view 112 of the motion sensor 14. However, the space 100 is still occupied. Before changing an occupancy status of the space from occupied to unoccupied, the controller 12 checks the people count. In the illustrative example of FIG. 6, the people count would still be one as only one person 130 has exited the space. For example, as the person 130 exits the space, the person sensor 16 detects that one person has left the space 100 and the people count is decreased from two to one. As the people count is still greater than zero, the controller 12 determines the space is still occupied. Another example of where motion may not be detected by the motion sensor 14 but the space 100 is still occupied is when one occupant is asleep. The people count can be used to determine whether the space 100 is occupied even though the motion sensor 14 does not detect motion. Likewise, the motion sensor 14 may determine that the space 100 is occupied even though the people count has reached zero. The use of both of these sensors can provide a robust and accurate occupancy status of the space 100.

Returning to FIG. 4, the controller 12 may determine that the space 100 is unoccupied when the motion sensor 14 does not detect motion in the space 100 and the people count is zero, as shown at block 314. Once an occupancy status of the space 100 is determined, the controller 12 may control one or more of the components 18 servicing the space 100 according to the occupancy status, as shown at block 316. In some cases, the controller 12 may transmit control commands directly to the one or more components 18. In other cases, the controller 12 may transmit the occupancy status or control commands to another controller responsible for controlling the one or more components 18. It is contemplated that the one or more of the components 18 servicing the space 100 may be operated in a first control mode when the space 100 is determined to be occupied. For example, the first control mode may include set points intended to provide comfort to the occupants of the space. The one or more of the components 18 servicing the space 100 may be operated in a second control mode when the space 100 is determined to be unoccupied. For example, the second control mode may include set points intended to provide energy savings when controlling the climate or lights of the space 100.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A system for controlling one or more components servicing a space of a building based on an occupancy status of the space, the system comprising:
   a motion sensor for detecting motion in at least part of the space;
   a person sensor for detecting each person passing through an access to the space as well as whether the person passing through the access to the space passed into the space or out of the space;
   a controller operatively coupled to the motion sensor and the person sensor, the controller configured to:
     monitor the motion sensor for detected motion in the space;
     monitor the person sensor and maintain a people count of people currently in the space by increasing the people count when the person sensor detects a person passing through the access and into the space and decreasing the people count when the person sensor detects a person passing through the access and out of the space;
     determine that the space is occupied when the motion sensor detects motion in the space;
     determine that the space is occupied when the motion sensor does not detect motion in the space but the people count maintained by the controller is greater than zero;
     determine that the space is unoccupied when the motion sensor does not detect motion in the space and the people count maintained by the controller is zero; and
     control one or more of the components servicing the space in a first control mode when the space is determined to be occupied and in a second control mode when the space is determined to be unoccupied.

2. The system of claim 1, wherein the controller is a distributed controller, wherein at least part of the controller is implemented by the person sensor.

3. The system of claim 2, wherein at least part of the controller is implemented by a thermostat or another wall module in the space, wherein the thermostat or other wall module houses the motion sensor.

4. The system of claim 1, wherein the access to the space includes a door, and wherein the person sensor is mounted at or adjacent the door.

5. The system of claim 4, wherein the person sensor is battery powered and is activated in response to detected activity.

6. The system of claim 1, wherein:
   the motion sensor is configured to anonymously detect motion in at least part of the space; and the person sensor is configured to anonymously detect each person passing through an access to the space as well as whether the person passing through the access to the space passed into the space or out of the space.

7. The system of claim 1, wherein the person sensor comprises a Time of Flight (ToF) sensor.

8. The system of claim 1, wherein the person sensor comprises a Light Detection and Ranging (LiDAR) sensor.

9. The system of claim 1, wherein the person sensor comprises mmWave sensor.

10. The system of claim 1, wherein the motion sensor comprises a passive infrared (PIR) sensor.

11. The system of claim 1, wherein the motion sensor comprises mmWave sensor.

12. A system for controlling one or more components servicing a space of a building based on an occupancy status of the space, the system comprising:
- a passive infrared (PIR) motion sensor for detecting motion in at least part of the space;
- a person sensor for detecting each person passing through a doorway of the space as well as whether the person passing through the doorway passed into the space or out of the space;
- a controller operatively coupled to the PIR motion sensor and the person sensor, the controller configured to:
  - monitor the PIR motion sensor for detected motion in the space;
  - monitor the person sensor and maintain a people count of people currently in the space by increasing the people count when the person sensor detects a person passing through the doorway and into the space and decreasing the people count when the person sensor detects a person passing through the doorway and out of the space;
  - determine that the space is occupied when the PIR motion sensor detects motion in the space;
  - determine that the space is occupied when the PIR motion sensor does not detect motion in the space but the people count maintained by the controller is greater than zero;
  - determine that the space is unoccupied when the PIR motion sensor does not detect motion in the space and the people count maintained by the controller is zero; and
  - control one or more of the components servicing the space in a first control mode when the space is determined to be occupied and in a second control mode when the space is determined to be unoccupied.

13. The system of claim 12, wherein the person sensor comprises a LiDAR sensor.

14. The system of claim 12, wherein the person sensor comprises a Time of Flight (ToF) sensor.

15. The system of claim 12, wherein the person sensor comprises a millimeter wave (mmWave) sensor.

16. A method for controlling one or more components servicing a space of a building based on an occupancy status of the space, the method comprising:
- receiving an output from a motion sensor, the motion sensor monitoring for motion in at least part of the space;
- receiving an output from a person sensor, the person sensor detecting each person passing through a doorway of the space as well as whether the person passing through the doorway passed into the space or out of the space;
- maintaining a people count of people currently in the space by increasing the people count when the person sensor detects a person passing through the doorway and into the space and decreasing the people count when the person sensor detects a person passing through the doorway and out of the space;
- determining that the space is occupied when the motion sensor detects motion in the space;
- determining that the space is occupied when the motion sensor does not detect motion in the space but the people count is greater than zero;
- determining that the space is unoccupied when the motion sensor does not detect motion in the space and the people count is zero; and
- controlling one or more of the components servicing the space in a first control mode when the space is determined to be occupied and in a second control mode when the space is determined to be unoccupied.

17. The method of claim 16, further comprising activating the person sensor when a door in the doorway is open.

18. The method of claim 16, wherein the space is a hotel room, and the one or more components servicing the hotel room comprise an HVAC component.

19. The method of claim 16, wherein the first control mode comprises a comfort mode and the second control mode comprises an energy savings mode.

20. The method of claim 16, wherein when the motion sensor detects motion in the space and the people count is zero, increasing the people count to one.

* * * * *